(12) United States Patent
Ono et al.

(10) Patent No.: US 7,256,853 B2
(45) Date of Patent: Aug. 14, 2007

(54) LIQUID CRYSTAL DISPLAY DEVICE HAVING PARTICULAR PIXEL REGION

(75) Inventors: Kikuo Ono, Mobara (JP); Ikuko Mori, Chiba (JP); Ryutaro Oke, Mobara (JP); Hiroyuki Yarita, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 352 days.

(21) Appl. No.: 10/977,934

(22) Filed: Nov. 1, 2004

(65) Prior Publication Data

US 2005/0105032 A1 May 19, 2005

(30) Foreign Application Priority Data

Nov. 18, 2003 (JP) .............................. 2003-387832

(51) Int. Cl.
*G02F 1/1343* (2006.01)

(52) U.S. Cl. ...................... 349/141; 349/144; 349/143; 349/146

(58) Field of Classification Search ................ 349/141, 349/144, 143, 146
See application file for complete search history.

(56) References Cited

U.S. PATENT DOCUMENTS

| 5,914,762 | A | 6/1999 | Lee et al. |
| 6,233,034 | B1 * | 5/2001 | Lee et al. ................... 349/141 |
| 6,256,081 | B1 * | 7/2001 | Lee et al. ................... 349/141 |
| 6,456,351 | B1 * | 9/2002 | Kim et al. ................... 349/141 |
| 6,784,964 | B2 * | 8/2004 | Nakayoshi et al. ......... 349/139 |
| 2001/0030717 | A1 * | 10/2001 | Kaneko et al. ............... 349/43 |

* cited by examiner

*Primary Examiner*—Mike Qi
(74) *Attorney, Agent, or Firm*—Reed Smith LLP; Stanley P. Fisher, Esq.; Juan Carlos A. Marquez, Esq.

(57) ABSTRACT

A liquid crystal display device with a planar counter electrode formed on the first substrate in each pixel region, a pixel electrode formed on the counter electrode by way of an insulation layer, the pixel electrode formed of a first pixel electrode and a second pixel electrode in the pixel region, the first pixel electrode and the second pixel electrode have a large number of slits which are arranged in parallel in the electrodes and the extending direction of the slits is different from both extending directions of the gate lines and the drain lines, and the neighboring sides of the first and the second pixel electrodes are arranged to be parallel to each other, and a portion between the neighboring sides of the first and the second pixel electrodes is positioned above the counter electrode.

12 Claims, 12 Drawing Sheets

LIQUID CRYSTAL DISPLAY DEVICE HAVING PARTICULAR PIXEL REGION

BACKGROUND OF THE INVENTION

1. Field of the Invention

The invention relates to a liquid crystal display device, and more particularly to a liquid crystal display device in which pixel electrodes and counter electrodes are formed on a liquid-crystal-surface side of one substrate out of respective substrates which are arranged to face each other with liquid crystal therebetween.

2. Description of the Related Art

This type of liquid crystal display device controls a quantity of light which transmits a region between the pixel electrode and the counter electrode by driving the liquid crystal to which an electric field generated between the respective electrodes is applied.

Such a liquid crystal display device has been known as a liquid crystal display device having so-called wide viewing angle characteristics which does not change a display even when a viewer observes a screen from the oblique direction with respect to the display screen.

Up to now, the pixel electrodes and the counter electrodes are formed of a conductive layer which does not allow light to pass therethrough.

However, recently, there has been known a liquid crystal display device in which a counter electrode formed of a transparent electrode is formed on a whole area of each pixel region except for a periphery of the pixel region and strip-like or comb-shaped pixel electrodes formed of a transparent electrode which extend in one direction and are arranged in parallel in the direction which intersects one direction are formed over the counter electrode by way of an insulation film.

The liquid crystal display device having such a constitution has been disclosed in, for example, Japanese Unexamined Patent Publication Hei 11(1999)-202356 or the corresponding U.S. Pat. No. 6,233,034.

SUMMARY OF THE INVENTION

However, in such a liquid crystal display device, the counter electrode which is formed in the region except for the slight periphery of the pixel region is overlapped to the comb-shaped pixel electrode formed by way of the insulation film with a large overlapped area. Accordingly, when pin holes are formed in the insulation film, a short-circuiting failure occurs and this becomes a black point defect whereby the quality of the image is lowered.

Further, when a source electrode of a thin film transistor or the pixel electrode is short-circuited with a gate signal line, a bright point defect occurs thus giving rise to a drawback that an image quality is deteriorated. Further, when the source electrode and the drain electrode of the thin film transistor are short-circuited, a bright point defect also occurs thus also giving rise to a drawback that an image quality is deteriorated.

As a countermeasure to cope with such short-circuiting, it may be considered to provide two thin film transistors in one pixel and divide the pixel region into halves. This is based on an idea of redundancy designing in which when one thin film transistor or one pixel region becomes defective, the normal operation is ensured by another transistor or another pixel region.

However, in such redundancy designing, it is necessary to hold at least one thin film transistor or one pixel region in a normal state and another transistor or another pixel region in a black-point defect. In the liquid crystal display device having the wide viewing angle, it is also necessary to normally operate the pixel to be corrected in a wide viewing angle range.

In spite of the above, there has been a drawback that, in the liquid crystal display device having a wide viewing angle range in which the pixel region is constituted of one rectangular transparent pixel electrode and another comb-like or strip-like transparent pixel electrode with the insulation film sandwiched therebetween, the above-mentioned redundancy designing has not been proposed. Particularly, when two-divided or two-split regions exist in one pixel region, there has been a drawback that no proposal has been made to favorably shield a boundary region from light without lowering the transmissivity or the numerical aperture. Further, there has been also a drawback that the pixel which is remedied by the redundancy designing causes a drawback that a viewing angle is lowered due to a color shift or the like.

Further, a liquid crystal display which requires such redundancy pixel structure is used in a liquid crystal television set having a large screen. In such an application, with respect to the pixel electrodes and the counter electrodes to which voltages for displaying images are applied, the voltage distortion of the counter electrode gives rise to a drawback. It is necessary to provide a layout of the counter electrode and the counter voltage signal lines to decrease the voltage distortion without lowering the transmissivity or the numerical aperture.

It is an advantage of the invention to provide a liquid crystal display device which can overcome such drawbacks.

Further, it is an advantage of the invention to provide a liquid crystal display device which can obviate brightness irregularities attributed to the random arrangement of liquid crystal at the time of driving the liquid crystal in a boundary of each divided region.

To achieve the above-mentioned advantage, the invention substantially provides following constitutions to solve the above-mentioned drawbacks.

(1) A liquid crystal display device according to the invention is characterized in that on each liquid-crystal-side pixel region of one substrate out of respective substrates which are arranged to face each other with liquid crystal therebetween, a counter electrode which is formed on a center portion excluding a slight periphery of the pixel region, an insulation film which is formed in a state that the insulation film covers the counter electrode, and a pixel electrode which is formed on the counter electrode in an overlapped manner are formed, the pixel electrode is configured such that, in each region of a plurality of divided regions in the pixel region, a group of strip-like electrodes is formed such that the respective strip-like electrodes are arranged in parallel in the direction which intersects the extending direction of the strip-like electrodes, wherein signals are supplied to the pixel electrodes of the respective divided regions through switching elements which differ from each other, and in the neighboring divided regions which are arranged close to each other among the plurality of divided regions, the respective strip-like electrodes of the group of strip-like electrodes in one region are arranged to have end portions thereof on another region side and, at the same time, the end portions of the respective electrodes are formed in a pattern in which the respective electrodes are connected with each other along a periphery of another region.

(2) A liquid crystal display device according to the invention is, for example, on the premise of the constitution (1), characterized in that the divided regions of the pixel region are provided in two and the extending direction of the respective electrodes of the pixel electrode of one region and the extending direction of the pixel electrode of the respective electrodes of another region are made different from each other.

(3) A liquid crystal display device according to the invention is, for example, on the premise of the constitution (1), characterized in that the divided regions of the pixel region are provided in two and using an imaginary line which traverses the two divided regions as a boundary, the extending directions of the electrodes of the respective pixel electrodes of the respective regions on one side are made equal, and, the extending directions of the pixel electrodes of the respective pixel electrodes of the respective regions on another side are made equal and, at the same time, are different from the extending directions of the pixel electrodes of the respective pixel electrodes of the respective regions on one side.

(4) A liquid crystal display device according to the invention is, for example, on the premise of the constitution (1), characterized in that the pixel region is constituted of a region which is surrounded by a pair of neighboring drain signal lines and a pair of neighboring gate signal lines, and the respective divided regions of the pixel region are formed using an imaginary line which is arranged substantially parallel to the drain signal lines as a boundary.

(5) A liquid crystal display device according to the invention is, for example, on the premise of the constitution (4), characterized in that the rubbing direction of the liquid crystal is arranged to be substantially aligned with the extending direction of the gate signal lines.

(6) The present invent is, for example, directed to a liquid crystal display device in which gate signal lines and drain signal lines are arranged on a first transparent insulation film substrate in a matrix array, a thin film transistor is provided to one pixel region which is surrounded by the neighboring gate signal lines and the neighboring drain signal lines, a strip-like or a comb-shaped second transparent pixel electrode is provided by way of a first rectangular transparent counter electrode and an insulation film, liquid crystal is sealed in a gap defined by laminating the first transparent substrate and another second transparent insulation substrate, and the liquid crystal is driven in response to an electric field generated between the first rectangular transparent electrode and the second strip-like transparent electrode, wherein the first thin film transistor and the second thin film transistor are provided to the first pixel region, the first pixel region which is constituted of the second transparent electrode is provided to the first thin film transistor, the second pixel region is provided to the second thin film transistor and, on the first rectangular transparent electrode which is surrounded by the first and the second pixel regions, the direction of an electric field which the first pixel electrode, the second pixel electrode and the first rectangular pixel electrode generate and the rubbing direction of the liquid crystal are substantially aligned with each other.

(7) A liquid crystal display device according to the invention is, for example, on the premise of the constitution (6), characterized in that a gap region having a given width which is formed over the rectangular first electrode sandwiched between the first pixel electrode and the second pixel electrode extends substantially parallel to the drain signal lines.

(8) A liquid crystal display device according to the invention is, for example, on the premise of the constitution (6), characterized in that the comb-shaped pixel electrode of the first pixel region which constitutes a display region and the comb-shaped pixel electrode of the second pixel region which constitutes the display region extend while making given angles with respect to a boundary of the pixel regions and, further, assume a symmetrical arrangement with respect to the boundary of the pixel regions.

(9) A liquid crystal display device according to the invention is, for example, on the premise of the constitution (6), characterized in that the comb-shaped pixel electrode of the first pixel region which constitutes a display region and the comb-shaped pixel electrode of the second pixel region which constitutes the display region extend while making given angles with respect to a counter voltage signal line which extends in parallel with the gate lines at a substantially center of the pixel region surrounded by the neighboring gate signal lines, and assume an symmetrical arrangement with respect to the counter voltage signal line.

(10) The invention is, for example, directed to a liquid crystal display device in which gate signal lines and drain signal lines are arranged on a first transparent insulation film substrate in a matrix array, a thin film transistor is provided to one pixel region which is surrounded by the neighboring gate signal lines and the neighboring drain signal lines, a strip-like or a comb-shaped second transparent pixel electrode is provided by way of a first rectangular transparent counter electrode and an insulation film, liquid crystal is sealed in a gap defined by laminating the first transparent substrate and another second transparent insulation substrate, and the liquid crystal is driven in response to an electric field generated between the first rectangular transparent electrode and the second strip-like transparent electrode, wherein a counter voltage signal line which extends in parallel with the gate signal line is formed on one end portion of the rectangular counter electrode which is arranged close to the gate signal line and a strip-like light shielding electrode which does not intersect the drain signal line is formed on another end portion of the rectangular counter electrode.

(11) A liquid crystal display device according to the invention is, for example, on the premise of the constitution (8) or (9), characterized in that the inclination of the pixel electrode with respect to the gate signal line is set to a value which falls within a range of 30 degrees in the clockwise direction or in the counterclockwise direction.

(12) The invention is, for example, directed to a liquid crystal display device in which a first substrate and a second substrate are arranged to face each other with a liquid crystal layer therebetween, a plurality of gate signal lines and a plurality of drain signal lines which intersect the gate signal lines are formed on the first substrate, and pixel regions are formed of regions which are surrounded by the neighboring gate lines and the neighboring drain lines, and a planar counter electrode is formed on the first substrate in each pixel region, wherein a pixel electrode is formed on the counter electrode by way of an insulation layer, the pixel electrode is formed of a first pixel electrode and a second pixel electrode in the pixel region, the first pixel electrode and the second pixel electrode have a large number of slits which are arranged in parallel in the electrodes and the extending direction of the slits is different from both extending directions of the gate lines and the drain lines, and the neighboring sides of the first and the second pixel electrodes are arranged to be parallel to each other, and a portion between the neighboring sides of the first and the second pixel electrodes is positioned above the counter electrode.

(13) A liquid crystal display device according to the invention is, for example, on the premise of the constitution (12), characterized in that the neighboring sides of the first and the second pixel electrodes are arranged in parallel to the drain line.

(14) A liquid crystal display device according to the invention is, for example, on the premise of the constitution (13), characterized in that the extending direction of the slits formed in the first pixel electrode and the extending direction of the slits formed in the second pixel electrode are different from each other.

(15) A liquid crystal display device according to the invention is, for example, on the premise of the constitution (14), characterized in that the slits formed in the first pixel electrode and the slits formed in the second pixel electrode extend in the directions which become symmetrical with respect to the extending direction of the drain lines.

(16) A liquid crystal display device according to the invention is, for example, on the premise of the constitution (12), characterized in that the first pixel electrode is connected with the first thin film transistor element, and the second pixel electrode is connected with the second thin film transistor element.

(17) A liquid crystal display device according to the invention is, for example, on the premise of the constitution (16), characterized in that the first thin film transistor element and the second thin film transistor element are controlled using the same gate line and, at the same time, are connected with the same drain line.

(18) A liquid crystal display device according to the invention is, for example, on the premise of the constitution (13), characterized in that the orientation direction of liquid crystal molecules of the liquid crystal layer is the direction which is orthogonal to the drain lines.

(19) A liquid crystal display device according to the invention is, for example, on the premise of the constitution (18), characterized in that the extending directions of the slits of the first pixel electrode and the second pixel electrode make an angle which falls within a range of 30 degrees in the clockwise direction or in the counterclockwise direction with respect to the extending direction of the gate signal line.

(20) A liquid crystal display device according to the invention is, for example, on the premise of the constitution (15), characterized in that the first pixel electrode is connected with a first thin film transistor element and the second pixel electrode is connected with a second thin film transistor element.

(21) A liquid crystal display device according to the invention is, for example, on the premise of the constitution (20), characterized in that the first thin film transistor element and the second thin film transistor element are controlled using the same gate line and are connected with the same drain line.

(22) A liquid crystal display device according to the invention is, for example, on the premise of the constitution (21), characterized in that the orientation direction of liquid crystal molecules of the liquid crystal layer is the direction which is orthogonal to the drain lines.

(23) A liquid crystal display device according to the invention is, for example, on the premise of the constitution (22), characterized in that the extending directions of the slits of the first pixel electrode and the second pixel electrode make an angle which falls within a range of 30 degrees in the clockwise direction or in the counterclockwise direction with respect to the extending direction of the gate signal line.

BRIEF DESCRIPTION OF THE DRAWINGS

FIG. 2A and FIG. 2B are equivalent circuit diagrams, wherein FIG. 2A is the schematic equivalent circuit diagram showing one embodiment of the liquid crystal display device according to the invention and FIG. 2B is the equivalent circuit diagram of a pixel portion;

FIG. 5A and FIG. 5B are schematic views for explaining the behavior of liquid crystal molecules, wherein FIG. 5A is the view for explaining the behavior of liquid crystal molecules when an electric field is not applied to liquid crystal and FIG. 5B is the view for explaining the behavior of liquid crystal molecules when an electric field is applied to the liquid crystal;

DETAILED DESCRIPTION OF THE INVENTION

Preferred embodiments of the liquid crystal display device of the invention are explained hereinafter in conjunction with drawings.

EMBODIMENT 1

Figure 2A:
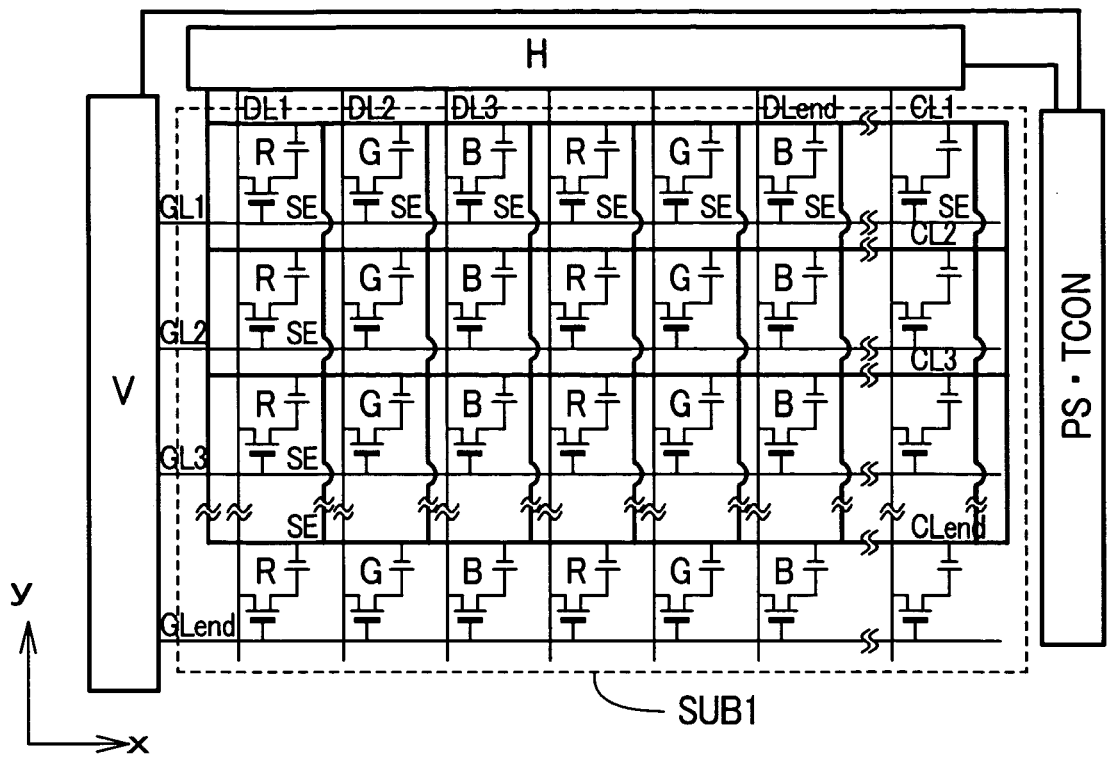

FIG. 2A is a view which shows an equivalent circuit of a liquid crystal display panel of one embodiment of the invention together with an externally mounted circuit of the liquid crystal display panel. Here, a pixel portion having the constitution shown in FIG. 2B constitutes one of the technical features of the invention.

In FIG. 2A, to respective gate signal lines GL which extend in the x direction and are arranged in parallel in the y direction, a scanning signal (a voltage signal) is sequentially supplied by a vertical scanning circuit V.

A thin film transistor TFT of each one of pixel regions which are arranged along the gate signal lines GL to which the scanning signal is supplied is turned on in response to the scanning signal.

Then, in conformity with this timing, a video signal is supplied to the respective drain signal lines DL from a video signal drive circuit H. The respective drain signal lines DL are, in the drawing, extended in the y direction and are arranged in parallel in the x direction. The video signal is applied to respective pixel electrodes PX through the thin film transistors of the respective pixel regions.

Further, a power source is supplied to the vertical scanning circuit V and the video signal drive circuit H from a power source supply PS, while a control signal is supplied to the vertical scanning circuit V and the video signal drive circuit H from a controller TCON.

In each pixel region, a counter voltage is supplied to a counter electrode CT which is formed together with the pixel electrode PX through a counter voltage signal line CL and an electric field is generated between the respective electrodes. With respect to the pixel electrode PX and the counter electrode CT, at the timing that an ON voltage is applied to the gate signal lines GL, the thin film transistor TFT is turned on and the video information voltage from the drain signal line DL is applied to the pixel electrode PX, while the counter voltage signal is transmitted to the counter electrode CT in each pixel region through the counter voltage signal line CL which is connected with the external power source and hence, the voltage is applied to the liquid crystal capacitance. The above-mentioned pixel electrodes PX and the counter electrodes CT are formed on a first transparent substrate SUB1 on which the thin film transistors TFT are formed. These pixel electrode PX and the counter electrode CT form a pixel capacitance CP which is a sum of a holding capacitive element Cstg which is generated by sandwiching an insulation film between the pixel electrode PX and the counter electrode CT and a liquid crystal capacitance Clc which is generated by allowing an electric field between the pixel electrode PX and the counter electrode CT to pass through a liquid crystal portion. Then, among these electric fields, in response to an electric field having components parallel to the transparent substrate SUB1, the optical transmissivity of the liquid crystal LC is controlled. The liquid crystal mode of the invention is characterized in that a stacked area of the counter electrode CT and the pixel electrode PX with the insulation film therebetween is large and hence, the holding capacitive element Cstg of one pixel can have a large value.

On the other hand, the counter voltage signal line CL is formed on the first transparent substrate SUB1 as a line in the lateral direction which is arranged in parallel to the gate signal line GL, wherein the counter voltage signal lines CL are connected with each other using lines extending in the longitudinal direction such that the lines transverse the gate signal lines GL while sandwiching the insulation of the first substrate SUB1 with the gate signal line GL thus forming mesh-like lines. Due to the mesh-like lines, even at a center region of the screen remote from an external power source, it is possible to remarkably reduce a phenomenon in which a large voltage amplitude of the gate signal line GL is fluctuated by way of the parasitic capacitance within one pixel and this fluctuation makes a voltage of the counter voltage signal line CL unstable thus giving rise to a defective display such as an image retention, flickering or the like attributed to the applying of a DC current voltage to the liquid crystal. As a result, due to this mesh-like connection of lines, the resistance specification of the counter voltage signal line CL which runs parallel to the gate signal line GL is alleviated and hence, a width of the counter voltage signal line CL on a layout can be narrowed whereby the transmissivity can be enhanced. The gate signal line GL and the counter voltage signal line CL which runs parallel to the gate signal line GL are connected by a connection line SE which is arranged on a protective film PAS by way of an insulation film with respect to the gate signal line GL. The line connecting method of the counter electrode CT and the line CL within the above-mentioned one pixel is explained in detail hereinafter.

Here, in the drawing, respective symbols R, G, B in the respective pixel regions mean that a red color filter, a green color filter and a blue color filter are respectively formed in the respective pixel regions. In the above-mentioned structure, one pixel region is a region which is surrounded by the neighboring drain signal lines DL and the neighboring gate signal lines GL and, as mentioned above, the thin film transistor TFT, the pixel electrode PX and the counter electrode CT are formed on the region.

Figure 2B:
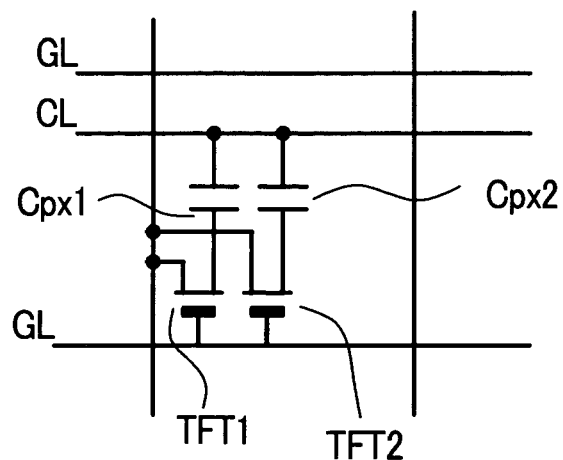

The detailed equivalent circuit of each pixel is shown in FIG. 2B. One pixel region is constituted of two thin film transistors TFT and two capacitive elements CP, wherein when one thin film transistor or one pixel region is defective, the normal operation is maintained on another thin film transistor and the pixel region thereof.

To the pixel, two thin film transistors TFT1, TFT2 which are connected with the same drain signal line and are controlled by the gate signal line are provided, wherein the thin film transistor TFT1 is connected with the first pixel electrode and the thin film transistor TFT2 is connected with the second pixel electrode. A holding capacitance Cpx1 is formed between the thin film transistor TFT1 and the potential of the counter voltage, while a holding capacitance Cpx2 is formed between the thin film transistor TFT2 and the potential of the counter voltage.

Figure 1:
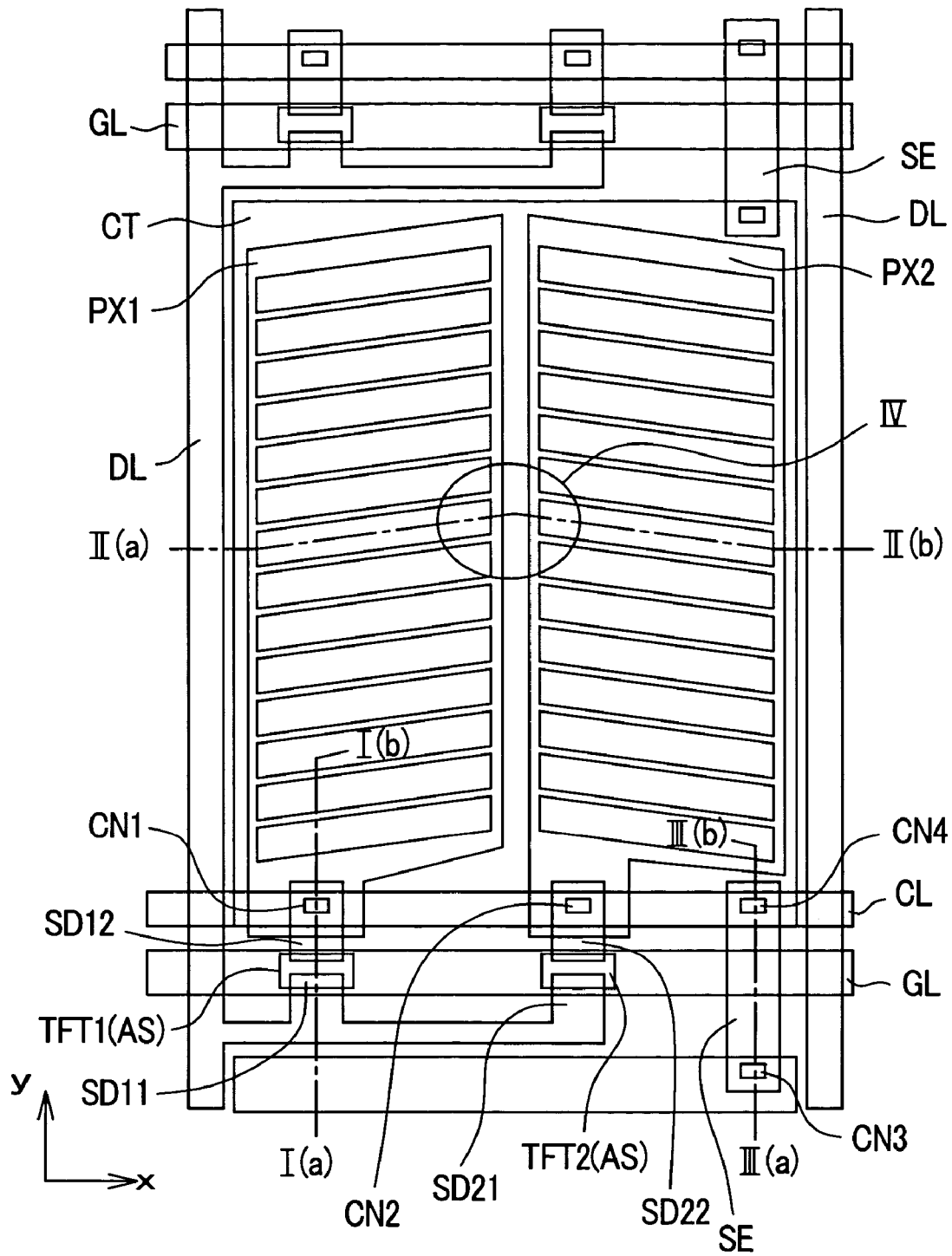
FIG. 1 is a plan view showing one embodiment of a pixel region of a liquid crystal display device according to the invention.

FIG. 1 is a constitutional view of a pixel region of the liquid crystal display device (panel) according to the invention and also is a plan view of one transparent substrate out of respective transparent substrates which are arranged to face each other with liquid crystal therebetween as viewed from a liquid crystal side.

Figure 3:
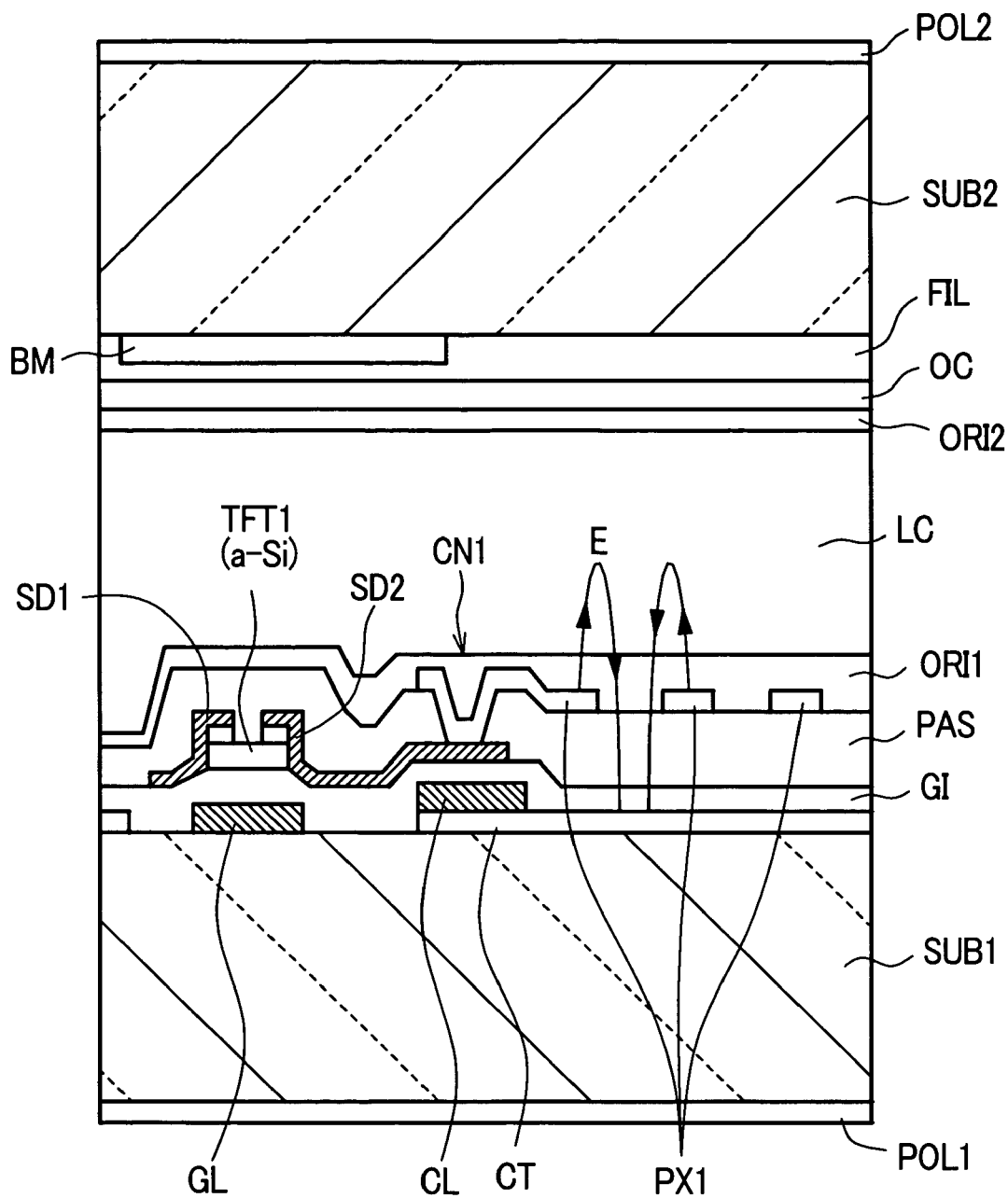
FIG. 3 is a cross-sectional view taken along a line I(a)-I(b) in FIG. 1.
Figure 4:
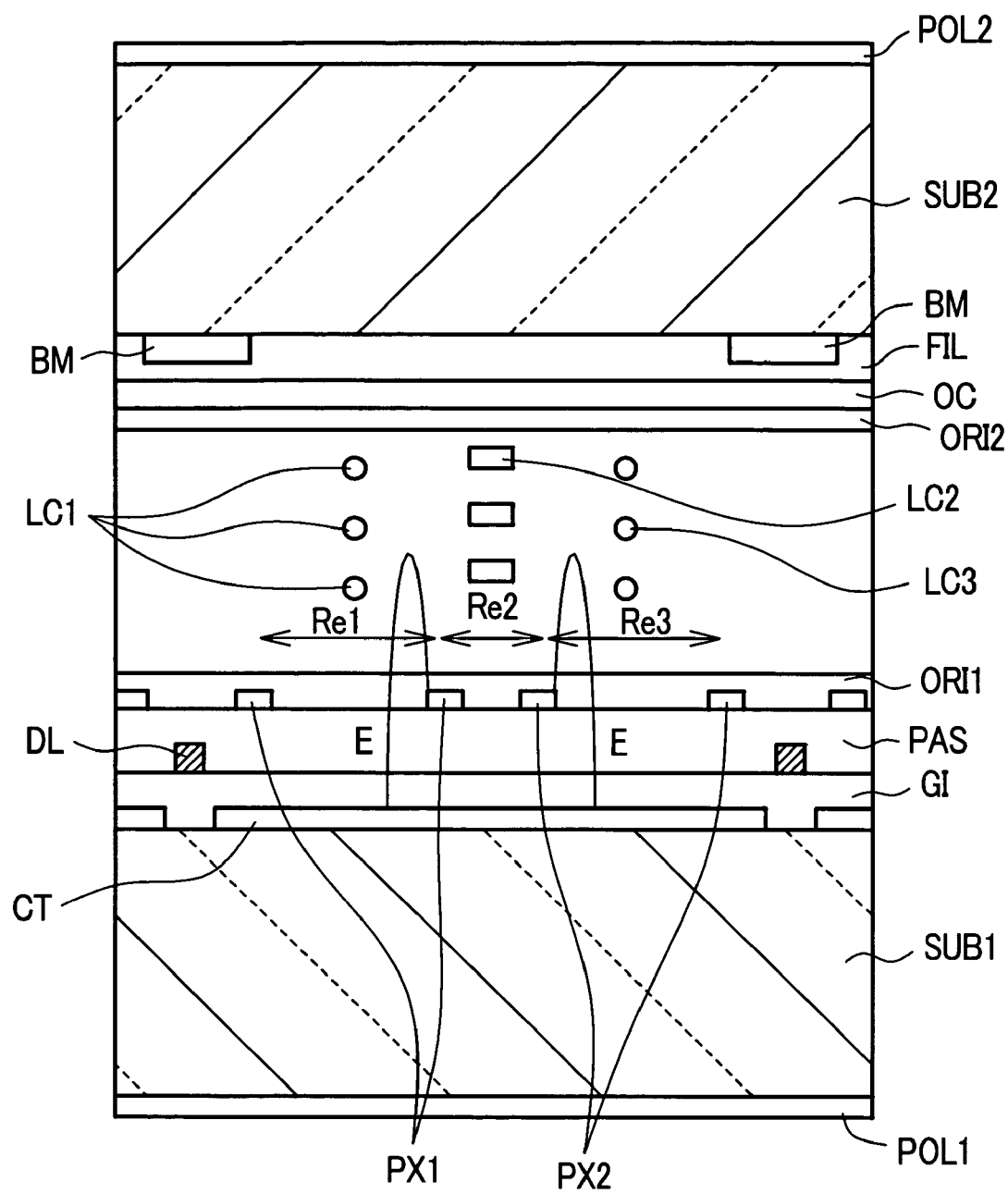
FIG. 4 is a cross-sectional view taken along a line II(a)-II(b) in FIG. 1.
Figure 6:
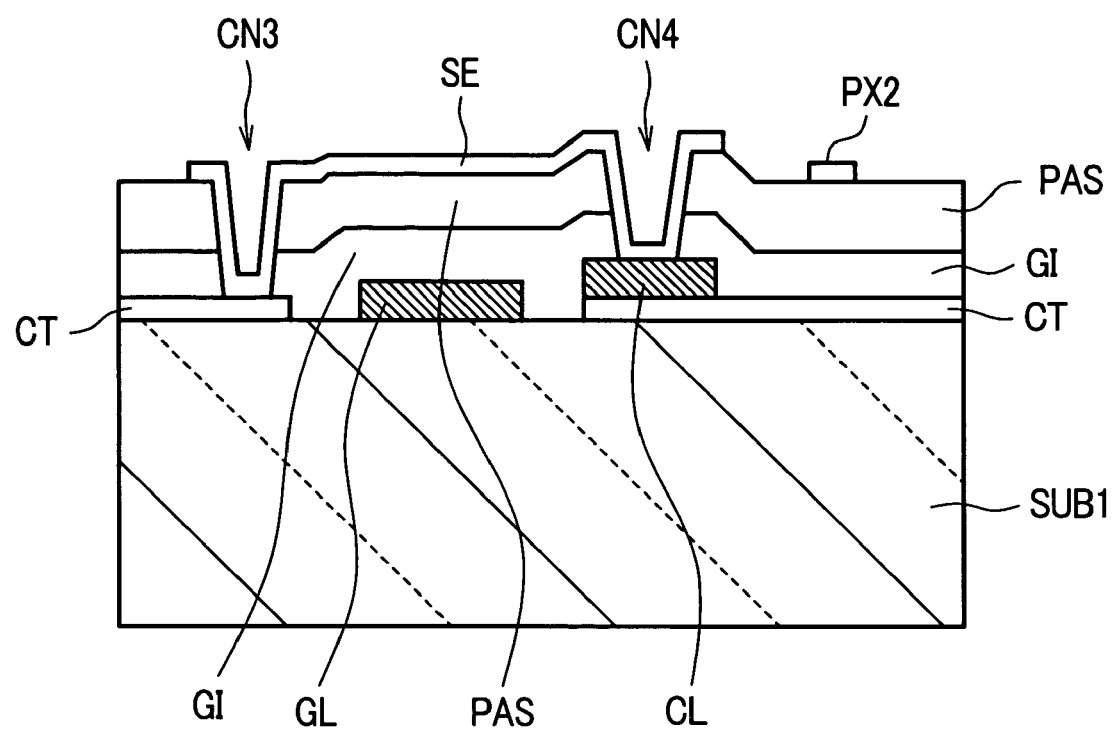
FIG. 6 is a cross-sectional view taken along a line III(a)-III(b) in FIG. 1.

FIG. 3 is a cross-sectional view taken along a line I(a)-I(b) in FIG. 1, FIG. 4 is a cross-sectional view taken along a line II(a)-II(b) in FIG. 1, and FIG. 6 is a cross-sectional view taken along a line III(a)-III(b) in FIG. 1.

FIG. 5 is a plan view schematically showing the operation of liquid crystal molecules at the time of turning on or off the voltage applied to the liquid crystal molecules in the vicinity of a boundary for two pixel regions in the inside of one pixel within a two-dot chain line frame IV shown in FIG. 1 in this liquid crystal mode.

First of all, in FIG. 1, the gate signal lines GL which extend in the x direction and are arranged in parallel in the y direction in the drawing supply a gate ON voltage to the thin film transistor TFT1 and the thin film transistor TFT2. In response to this gate ON voltage, for example, charges are induced in an interface of the gate insulation film GI which covers an amorphous silicon semiconductor layer AS and the gate signal line GL, for example, and hence, the transistor is turned on and the capacitive element which uses the first pixel electrode PX1, the second pixel electrode PX2 and the counter electrode CT which is formed on the same substrate as respective electrodes thereof are charged. The thin film transistors TFT1 and TFT2 supply charges to the capacitive element in response to a video signal transmitted from the drain signal line DL. In this manner, the thin film transistor TFT1 and the thin film transistor TFT2 perform the same operation with respect to the time-sequential timing.

The above-mentioned gate signal line GL is formed of a three-layered stacked film made of molybdenum (Mo), aluminum (Al), and molybdenum (Mo) which are stacked from the first transparent side, for example. This gate signal line GL forms a rectangular region with the drain signal line DL which will be explained later and this region is configured to form the pixel region.

Then, in this pixel region, the counter electrode CT which generates an electric field between the counter electrode CT and the pixel electrode PX described later is formed. The counter electrode CT is formed to cover the whole area of the pixel region except for a periphery of the pixel region and is made of ITO (Indium-Tin-Oxide), for example, which is a transparent conductor.

The counter electrode CT is connected with the counter voltage signal line CL which is arranged in the vicinity of the neighboring gate signal line GL and is connected with the counter voltage signal line CL which is arranged parallel to the above-mentioned gate signal line GL, and the counter voltage signal line CL is integrally formed with the counter electrode CT.

The counter voltage signal line CL is formed of an opaque material formed of a three-layered stacked film made of molybdenum (Mo), aluminum (Al) and molybdenum (Mo), for example.

Further, as mentioned above, by setting the material of the counter voltage signal line CL equal to the material of the gate signal line GL, the counter voltage signal line CL and the gate signal line GL can be formed in the same step and hence, the increase of the manufacturing man-hours can be obviated.

Here, it is needless to say that the above-mentioned counter voltage signal line CL is not limited to the above-mentioned three-layered film and, may be formed of a single-layered film made of Cr, Ti, Mo, for example, or a two-layered film or a three-layered film made of these materials and a material which contains Al.

However, in this case, it is advantageous to position the counter voltage signal line CL above the counter electrode CT. This is because that a selective etchant (for example, HBr) for the ITO film which constitutes the counter electrode CT can easily melt Al.

Further, it is advantageous to interpose a high-melting-point metal such as Ti, Cr, Mo, Ta, W or the like in at least a contact surface between the counter voltage signal line CL and the counter electrode CT. This is because that ITO which constitutes the counter electrode CT oxidizes Al in the counter voltage signal line CL and forms a high resistance layer.

Accordingly, as one embodiment, in forming the counter voltage signal line CL made of Al or a material containing Al, it is preferable to adopt the multi-layered structure which uses the above-mentioned high melting point metal as the first layer.

Further, on an upper surface of the transparent substrate SUB1 on which the counter electrode CT, the counter voltage signal line CL and the gate signal line GL are formed, an insulation film GI made of SiN, for example, is formed such that the insulation film GI covers the counter electrode CT, the counter voltage signal line CL and the gate signal line GL.

The insulation film GI has a function of an interlayer insulation film of the counter voltage signal line CL and the gate signal line GL with respect to the drain signal line DL described later, has a function of a gate insulation film of the thin film transistor TFT described later in a region where the thin film transistor TFT is formed, and has a function of a dielectric film of the capacitive element described later where the capacitive element is formed.

Then, although the thin film transistors TFT1 and TFT2 are formed such that the thin film transistors TFT1, TFT2 are overlapped to a portion of the gate signal line GL by way of the insulation film GI, a drain electrode SD11 and a source electrode SD12 are formed on an upper surface of the semiconductor layer AS with respect to the thin film transistor TFT1 and a drain electrode SD21 and a source electrode SD22 are formed on the upper surface of the semiconductor layer AS with respect to the thin film transistor TFT2 and hence, an MIS type transistor having the inverse staggered structure which uses a portion of the gate signal line GL as the gate electrode is formed. Accordingly, the drain electrodes SD11, SD21 and the source electrodes SD12, SD22 are simultaneously formed with the drain signal line DL.

That is, the drain signal lines DL which extend in the y direction and are arranged in the x direction in FIG. 1 are formed, and portions of the drain signal lines DL are extended on the surface of the semiconductor layer AS of the thin film transistor TFT whereby the drain electrodes SD11 and SD21 of the thin film transistor TFT are constituted.

Further, at the time of forming the drain signal lines DL, the source electrodes SD12 and the SD22 are formed, wherein these source electrodes SD12, SD22 are extended into the inside of the pixel regions so that contact portions CN1 and CN2 which are provided for connecting the pixel electrodes PX1 and the pixel electrodes PX2 described later are also integrally formed.

Here, as shown in FIG. 3, on interfaces between the above-mentioned source electrodes SD12, SD22 and the drain electrodes SD11, SD21 of the semiconductor layer AS, contact layers d0 which are doped with n-type impurities, for example, are formed.

The contact layers d0 are formed such that an n-type impurity doping layer is formed over the whole area of a surface of the semiconductor layer AS, the source electrodes SD12, SD22 and the drain electrodes SD11, SD21 of the semiconductor layer AS are formed and, thereafter, using these electrodes as masks, the n-type impurity doping layers which are formed on surfaces of the semiconductor layers AS which are exposed from the respective electrodes are etched.

Then, on the surface of the transparent substrate SUB1 on which the thin film transistors TFT are formed in such a manner, a protective film PSV made of SiN, for example, is formed such that the protective film PSV also covers the thin film transistor TFT. The protective film PSV is provided for preventing the direct contact of the thin film transistor TFT with the liquid crystal LC.

Further, on an upper surface of the protective film PSV, the pixel electrodes PX are formed using a transparent conductive film made of ITO (Indium-Tin-Oxide), for example.

In this case, the pixel electrodes PX are configured, as shown in FIG. 1, for example such that pixel electrodes PX1 and pixel electrodes PX2 are respectively formed in two regions which are divided using an imaginary line which extends in the y direction in the drawing at the center of the pixel region as a boundary. These pixel electrodes PX1, PX2 are electrically separated from each other and the video signal from the same drain signal line DL is supplied to the pixel electrodes PX1, PX2 through separate thin film transistors TFT1, TFT2 described later.

For example, the pixel electrodes PX which are positioned on the left side in the drawing are configured such that a plurality of strip-like electrodes which are arranged substantially parallel (having an inclination of approximately 10°) to the running direction of the gate signal line GL are arranged in parallel along the running direction of the drain signal line DL. In this case, it is necessary to supply the video signal from the thin film transistor TFT1 to the respective electrodes and hence, a pattern in which drain-signal-line-DL-side end portions of the respective electrodes are connected in common is formed and the connection portion is formed close to and parallel to the drain signal line DL.

Further, at end portions of the respective electrodes on a side opposite to the drain signal line DL, that is, at the end portions of the respective electrodes which are directed to another region side neighboring to the region, a pattern in which the end portions are connected in common is adopted and the connection portion is formed parallel to the drain signal line DL.

The connecting portion is, compared to a case in which the connecting portion is not formed, configured such that the end portions of the respective pixel electrodes which are formed of a group of electrodes are positioned at the substantially center position of the pixel region and hence, a complicate behavior of liquid crystal molecules attributed to the non-uniform electric field at these end portions can be avoided.

Also in another region arranged close to the region, the pixel electrodes PX2 having the substantially same pattern is formed and these regions are formed in a symmetrical shape with respect to an imaginary line which divides the respective regions. Accordingly, also with respect to the pixel electrodes PX2, the respective electrodes of a group of electrodes which constitute the pixel electrodes PX2 are configured such that the end portions which are directed to one region side are formed in a pattern that the end portions are connected in common and the connecting portion is formed in parallel to the drain signal line DL.

As mentioned above, the connection portion is provided for avoiding a phenomenon that, when the connecting portion is not formed, end portions of the respective pixel electrodes which are formed of a group of electrodes are positioned at the substantially center portion of the pixel region and hence, the complicate behavior of the liquid crystal molecules attributed to the non-uniform electric fields is avoided at the end portions.

Accordingly, at the center portion of the pixel region, the separation portion between the pixel electrodes PX1 and the pixel electrodes PX2 is formed substantially in parallel with the drain signal line DL, wherein the separation portion is configured such that the direction of the electric field becomes substantially uniform between the connecting portion formed on the pixel-electrode-PX2-side of the respective electrodes of the pixel electrode PX1 and the connecting portion formed on the pixel-electrode-PX1-side of the respective electrodes of the pixel electrode PX2.

In this embodiment, a distance L between the respective comb-shaped teeth in the neighboring pixel electrode PX1 or the pixel electrode PX2 is set to 3 to 10 μm, for example, while a width of the comb-shaped teeth is set to 2 to 6 μm, for example.

In this case, respective material layers of the respective pixel electrodes PX1 and PX2 which are formed at lower ends thereof are connected with contact portions of the source electrodes SD12, SD22 of the thin film transistors TFT through contact holes CN1 and CN2 formed in the respective protective films PSV. On the other hand, respective material layers of the respective pixel electrodes PX1 and PX2 which are formed at upper ends thereof are formed to be overlapped with the counter electrode CT.

By adopting such a constitution, on portions where the counter electrode CT and the respective pixel electrodes PX are overlapped to each other, a capacitive element which adopts a stacked layer film constituted of the insulation film GI and the protective film PSV as a dielectric film is formed.

The capacitive element is, as shown in the cross-sectional view of FIG. 3 or FIG. 4, formed of a capacitive element which is generated by lines of electric force leading to the counter electrode CT from the pixel electrodes PX1 or PX2 made of ITO formed on the protective film PSV by way of the liquid crystal LC, the protective film PSV and the gate insulation film GI and a capacitive element which is generated by lines of electric force leading to the counter electrode CT formed directly below the pixel electrodes PX1 or PX2 from the pixel electrodes PX1 or PX2. The latter capacitive element is a holding capacitance Cstg. The holding capacitance Cstg is provided for storing the video signal in the pixel electrode for a relatively long time even when the thin film transistor TFT is turned off after the video signal from the drain signal line DL is applied to the pixel electrodes PX through the thin film transistor TFT.

Here, the capacitance of the capacitive element Cstg is proportional to the overlapped area of the counter electrode CT and the respective pixel electrodes PX and the overlapped area is relatively increased. The dielectric film of the capacitance is a stacked film formed of the insulation film GI and the protective film PSV.

It is needless to say that the material of the protective film PSV is not limited to SiN and may be formed of synthetic resin, for example. In this case, since the protective film PSV can be formed by coating, it is possible to obtain an advantageous effect that the manufacture of the liquid crystal display device can be facilitated even when a film thickness of the protective film PSV is increased.

Further, on a surface of the transparent substrate on which the pixel electrodes PX1 or the pixel electrodes PX2 are formed, an orientation film ORI1 is formed such that the orientation film ORI1 also covers the pixel electrodes PX. The orientation film ORI1 is a film which is directly brought into contact with the liquid crystal LC and is provided for determining the initial orientation direction of the liquid crystal LC.

On the other hand, the counter voltage signal lines CL are formed on the first transparent substrate SUB1 as lines which are arranged in parallel to the gate signal lines GL, wherein the counter voltage signal lines CL are connected with each other using lines extending in the longitudinal direction such that the lines transverse the gate signal lines GL while sandwiching the insulation of the first substrate SUB1 with the gate signal line GL thus forming mesh-like lines. Due to the mesh-like lines, even at a center region of the screen remote from an external power source, it is possible to remarkably reduce a phenomenon in which a large voltage amplitude of the gate signal line GL is fluctuated by way of the parasitic capacitance within one pixel and this fluctuation makes a voltage of the counter voltage signal line CL unstable thus giving rise to a defective display such as an image retention, flickering or the like attributed to the applying of a DC current voltage to the liquid crystal. As a result, due to this mesh-like connection of lines, the resistance specification of the counter voltage signal line CL which runs parallel to the gate signal line GL is alleviated and hence, a width of the counter voltage signal line CL on a layout can be narrowed whereby the transmissivity can be enhanced. The gate signal line GL and the counter voltage signal line CL which runs parallel to the gate signal line GL are connected by a connection line SE which is arranged on a protective film PAS by way of an insulation film with respect to the gate signal line GL.

In this embodiment, by connecting the neighboring upper and lower counter electrodes CT using the connection lines SE at the right lower side and the right upper side of the plan view shown in FIG. 1, even when a width of the counter voltage signal line CL is narrow and exhibits the high resistance, the deterioration of the image quality is not induced. As a result, the transmissivity can be enhanced.

FIG. 6 is a cross-sectional view of the connection line SE which is arranged taken along a line III(a)-III(b) in FIG. 1. The connection line SE is a line which connects the respective counter electrodes CT of the upper and lower neighboring pixel regions. As can be understood from the cross-sectional structure shown in FIG. 6, contact holes CN3, CN4 are formed in the gate insulation film GI and the protective film PSV formed on the counter electrodes CT which are arranged in a rectangular shape within one pixel such that the counter electrodes CT sandwich the gate insulation film GI, and the counter electrodes CT are connected with each other by the connection line SE made of ITO which is formed in the same step for the pixel electrodes PX1 and PX2 via the contact holes CN3, CN4. Below the contact hole CN4, the counter voltage signal line CL which is formed in the same step as the gate signal line GL is formed. Another contact hole CN3 is connected with the counter electrode CT. The counter electrode CT is directly connected with the counter voltage signal line CL. Accordingly, the gate signal line GL and the counter voltage signal line CL which runs parallel to the gate signal line GL are connected with each other using the repeated constitution of the counter electrode CT and the connection line SE. Due to such a constitution, the wiring time constant of the counter voltage signal line CL is drastically decreased compared to the case in which the counter electrodes CT are not connected using the connection line SE.

In the above-mentioned embodiment, although the explanation is made with respect to the case in which ITO is used as the material of the transparent conductive film, it is needless to say that the substantially equal advantageous effect can be obtained even when IZO (Indium-Zinc-Oxide) is used as the material of the transparent conductive film.

The first transparent substrate SUB1 which has the above-mentioned constitution is referred to as a TFT substrate, while the second transparent substrate SUB2 which is arranged to face the TFT substrate with liquid crystal LC therebetween is referred to as a filter substrate.

With respect to the filter substrate, as shown in FIG. 3 and FIG. 4, a black matrix BM is formed on a liquid-crystal-side surface of the filter substrate such that respective pixel regions are defined and in opening portions of the black matrix BM which substantially determine the pixel regions, filters FIL are formed so as to cover the opening portions.

Then, an overcoat film OC formed of a resin film, for example, is formed to cover the black matrix BM and the filters FIL. An orientation film ORI2 is formed on an upper surface of the overcoat film. The above describes the schematic planar and cross-sectional constitutions of the embodiment 1.

Next, the manner of operation of the redundancy structure in this liquid crystal mode is explained in conjunction with FIG. 1, FIG. 4 and FIG. 5. In this embodiment, as the liquid crystal, so-called positive-type nematic liquid crystal in which the long-axis direction of the liquid crystal molecules are aligned in the electric field direction is used. The turning on and off of the liquid crystal display exhibits the behavior which has the normally-black voltage-transmissivity characteristics in which the display state is a black state when no electric field is applied and is transformed into a white state when the voltage is applied.

FIG. 4 is a cross-sectional view taken along a two-dot chain line II(a)-II(b) shown in FIG. 1. The left side as viewed from the front in FIG. 4 is indicated by II(a) and the right side as viewed from the front in FIG. 4 is indicated by II(b). In this in-plane display mode (that is, a mode in which the pixel electrodes PX1 or PX2 and the counter electrode CT are provided to the first substrate SUB1 side), lines of electric force (E in FIG. 4) from the comb-teeth shaped pixel electrodes PX1 or PX2 are applied to the inside of the liquid crystal LC, wherein the lines of electric force pass through the protective insulation film PAS formed in gaps of the above-mentioned comb teeth and the insulation film GI through the inside of the liquid crystal LC and reaches the counter electrode CT which is formed on the whole area of the pixel region in a substantially rectangular shape. In FIG. 4, the liquid crystal molecules LC1 in the left-side region (the region indicated by Re1 in FIG. 4) with respect to the center counter voltage signal line CL are rotated in the clockwise direction with respect to the direction substantially parallel to the first substrate SUB1, while the liquid crystal molecules LC3 in the right-side region (the region indicated by Re3) in FIG. 4 with respect to the center counter voltage signal line CL are rotated in the counterclockwise direction with respect to the direction substantially parallel to the first substrate SUB1. Due to these rotations, the transmissivity is changed thus enabling the display.

On the other hand, in the center region (Re2) shown in FIG. 4, although the lines of electric force which start from the pixel electrode PX1 and the pixel electrode PX2 reach the counter electrode CT through the liquid crystal region, no light passes through optically. This is because that, as can be understood from the planar structure shown in FIG. 1, this region is a region on the counter electrode CT which is sandwiched by two regions where two pixel electrodes PX1 and PX2 respectively extend in parallel with the drain signal line DL. That is, in this liquid crystal display device, since the rubbing is applied in parallel to the gate signal line GL, in the region which is sandwiched by the pixel electrodes PX1 and PX2, the direction of the electric field and the long-axis direction of the liquid crystal molecules are aligned with each other. Accordingly, even when the electric field is applied to the liquid crystal, the liquid crystal molecules are not rotated and the black display is held as it is even on the transparent pixel electrode CT. Accordingly, due to the advantageous effect of the redundancy pixel, even when the pixel electrode of either one of the pixel electrodes PX1 and PX2 which constitute two pixel regions becomes defective, that is, even when the different potentials are applied to the pixel electrodes PX1, PX2, the black display is maintained. In the conventional liquid crystal display device, a portion between two pixel regions is shielded from light by a metal electrode thus separating a boundary and hence, while in the liquid crystal display device of the invention, the light shielding electrode and the transparent pixel electrode are overlapped to each other thus lowering even the transmissivity of the normal pixel. According to the liquid crystal display device of the invention, since the metal electrode is unnecessary, the invention can provide the liquid crystal display device which can prevent such a drawback.

Figure 5A:
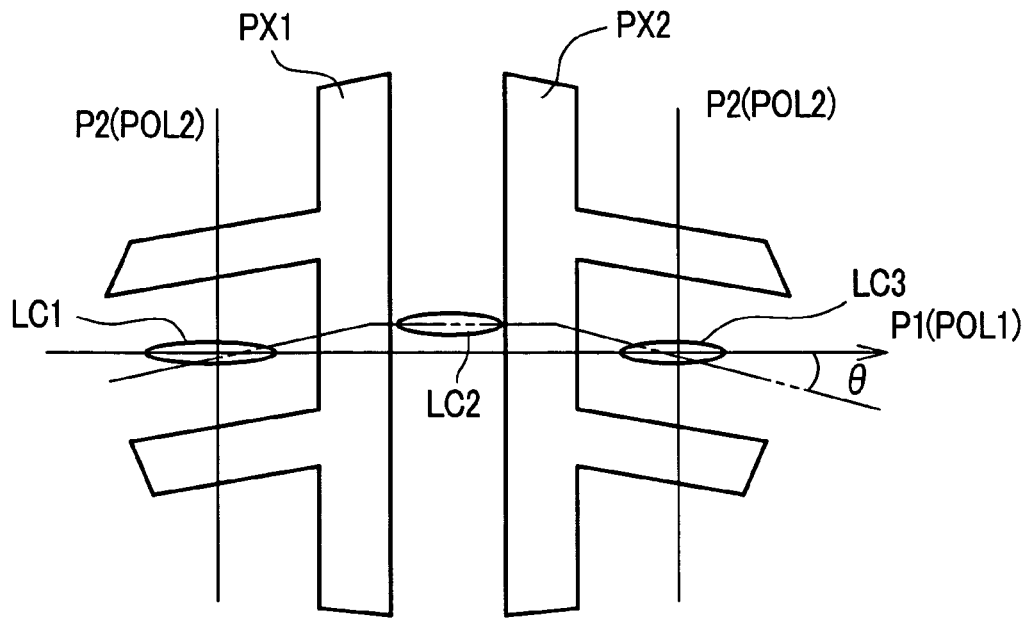
Figure 5B:
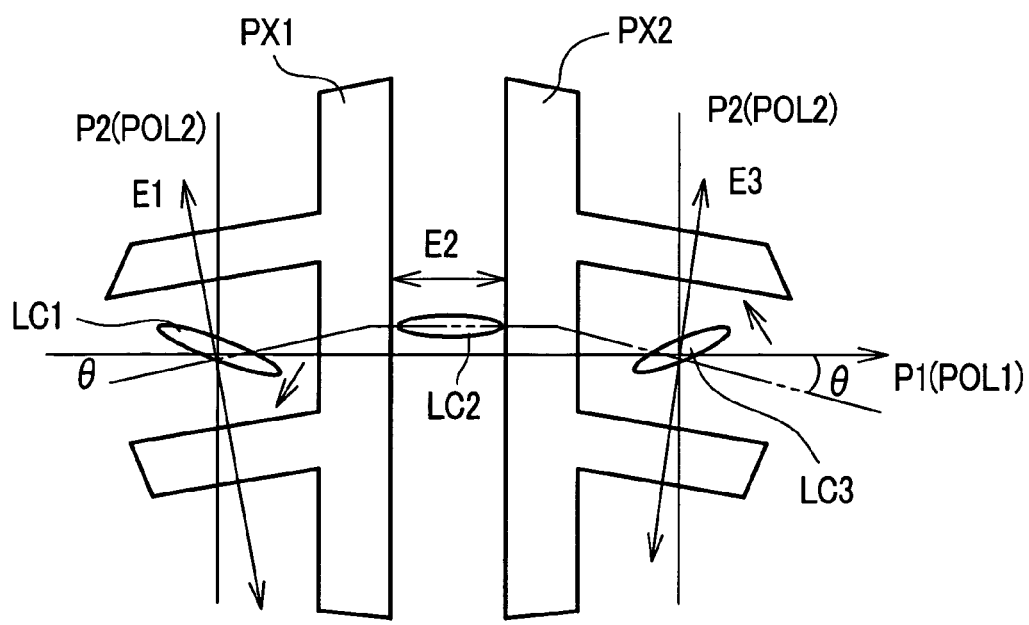

Further, the manner of optical operation is explained in conjunction with FIG. 5A and FIG. 5B. FIG. 5A shows the manner of operation of the liquid crystal molecules when the electric field is not applied between the pixel electrodes PX1, PX2 shown in FIG. 3 or FIG. 4 and the counter electrode CT, and FIG. 5B shows the manner of operation of the liquid crystal molecules when the electric field is applied between the pixel electrodes PX1, PX2 shown in FIG. 3 or FIG. 4 and the counter electrode CT. Here, a polarization axis P1 of the polarizer POLL on the first-substrate-SUB1 side is set to the direction of the first gate signal line GL, while a polarization axis P2 of the polarizer POL2 on the second-substrate-SUB2 side is arranged along the direction of the drain signal line DL shown in FIG. 1. That is, the cross-nicol polarization axis arrangement is adopted. The rubbing is applied to both of the orientation films ORL1, ORL2 of the first and second substrates in the direction parallel to the first polarization axis, that is, the gate signal line GL.

In the region of the pixel electrode PX1 shown in FIG. 1, the comb-teeth-like pixel electrode PX1 is arranged such that the pixel electrode PX1 extends with an inclination of approximately 10 degrees in the counterclockwise direction with respect to the gate signal line GL, that is, the polarization axis P1. On the other hand, in the region of the pixel electrode PX2 shown in FIG. 1, the pixel electrode PX2 is arranged such that the pixel electrode PX2 extends with an inclination of approximately 10 degrees in the clockwise direction with respect to the polarization axis P1.

When the voltage applied to the liquid crystal is not present or small, the long axes of the liquid crystal molecules LC1, LC3 are aligned with the extending direction of the gate signal line GL. The liquid crystal molecules LC1 (Re1 region in FIG. 4) follow this and are rotated in the electric field direction, that is, in the clockwise direction, and exhibits the largest transmissivity when the long axis thereof is rotated to be aligned with the −45 degree direction with respect to the polarization axis of the polarizer. To the contrary, the liquid crystal molecules LC3 (Re13 region in FIG. 4) are rotated reversely in the counterclockwise direction and exhibits the largest transmissivity when the long axis thereof is rotated to be aligned with the 45 degree direction in the polarization axis of the polarizer. In this embodiment, the liquid crystal molecules in one pixel are divided into two regions for the clockwise rotation and the counterclockwise rotation respectively and hence, it is possible to provide a display having a wide viewing angle in which a viewing angle of the screen is not inverted as viewed from any direction and the color change is small. Further, the pixel electrode PX and the counter electrode CT are made of transparent ITO and, at the same time, the sufficient electric field can be applied to the liquid crystal LC and hence, it is possible to provide the bright image by allowing the light to pass through the substantially whole area in the pixel region inside the black matrix BM.

On the other hand, in the boundary region (Re2 region shown in FIG. 4) which is surrounded by two pixel electrodes PX1 and PX2, in a state that the electric field is not applied, the long axes of the liquid crystal molecules LC2 are aligned along with the rubbing direction, that is, the first polarization axis P1 and hence, the cross-nicol black state is maintained. Further, even when the electric field is applied, the lines of electric force which reach the counter electrode CT from the pixel electrode PX1 or PX2 through the liquid crystal layer as indicated in the cross section shown in FIG. 4 extend in the direction along the gate signal line, that is, the first polarization axis as viewed in plane. This is because that two pixel electrodes PX1, PX2 are arranged to extend parallel to the drain signal line DL as shown in the plan view of FIG. 1. Since the direction of the electric field is parallel to the first polarization axis P1, even when any electric field is applied to the liquid crystal molecules LC2, the black state is maintained. That is, even in a case that the pixel electrodes P1, PX2 assume the same potential and form the electric field with the counter electrode CT in the normal operation, even when one electrode becomes defective and the pixel electrodes PX1 and PX2 assume the different potential, there is no change in the direction of the electric field and hence, the boundary region between the pixel electrodes PX1, PX2 to which the redundancy designing is applied always maintains the black state.

To explain the above-mentioned concept of the invention using other expression, it goes as follows.

That is, in the liquid crystal display device in which the first substrate and the second substrate are arranged to face each other with liquid crystal layer therebetween, the plurality of gate signal lines and the plurality of drain signal lines which intersect the gate signal lines are formed on the first substrate, and pixel regions are formed of regions which are surrounded by the neighboring gate lines and the neighboring drain lines, and the planar counter electrode is formed on the first substrate in each pixel region, wherein the pixel electrode is formed on the counter electrode byway of the insulation layer, the pixel electrode is formed of the first pixel electrode and the second pixel electrode in the pixel region, the first pixel electrode and the second pixel electrode have the large number of slits which are arranged in parallel in the electrodes and the extending direction of the slits is different from both extending directions of the gate lines and the drain lines, and the neighboring sides of the first and the second pixel electrodes are arranged to be parallel to each other, and the portion between the neighboring sides of the first and the second pixel electrodes is positioned above the counter electrode.

Further, FIG. 1 discloses, for example, the feature that neighboring sides of the first and the second pixel electrodes are arranged in parallel to the drain lines.

Further, FIG. 1 discloses, for example, the feature that the slits formed in the first pixel electrode and the slits formed in the second pixel electrode have respective extending directions which are different from each other.

Further, for example, FIG. 1 discloses that the slits formed in the first pixel electrode and the slits formed in the second pixel electrode extend in the symmetrical directions with respect to the extending direction of the drain line.

Further, for example, FIG. 1 discloses that the first pixel electrode is connected with the first thin film transistor element and the second pixel electrode is connected with the second thin film transistor element.

Further, FIG. 1 discloses, for example, that the first thin film transistor element and the second thin film transistor element are controlled using the same gate line and are connected to the same drain line.

Further, FIG. 1 and the FIG. 5A which is the explanatory view of the essential part in FIG. 1 disclose that the orientation direction of the liquid crystal molecules of the liquid crystal layer is the direction orthogonal to the drain line.

EMBODIMENT 2

Figure 7:
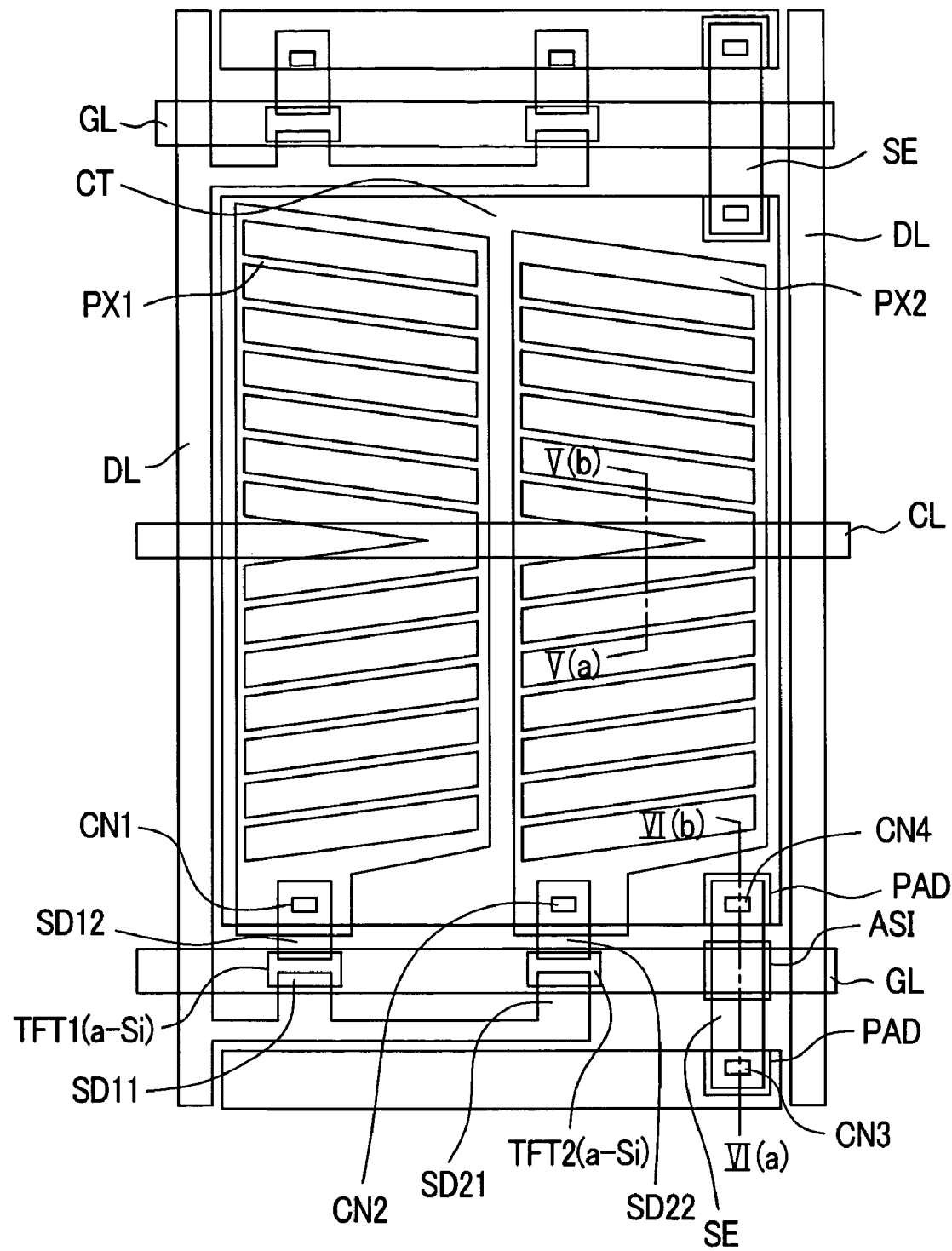
FIG. 7 is a plan view showing another embodiment of a pixel region of a liquid crystal display device according to the invention.
Figure 8:
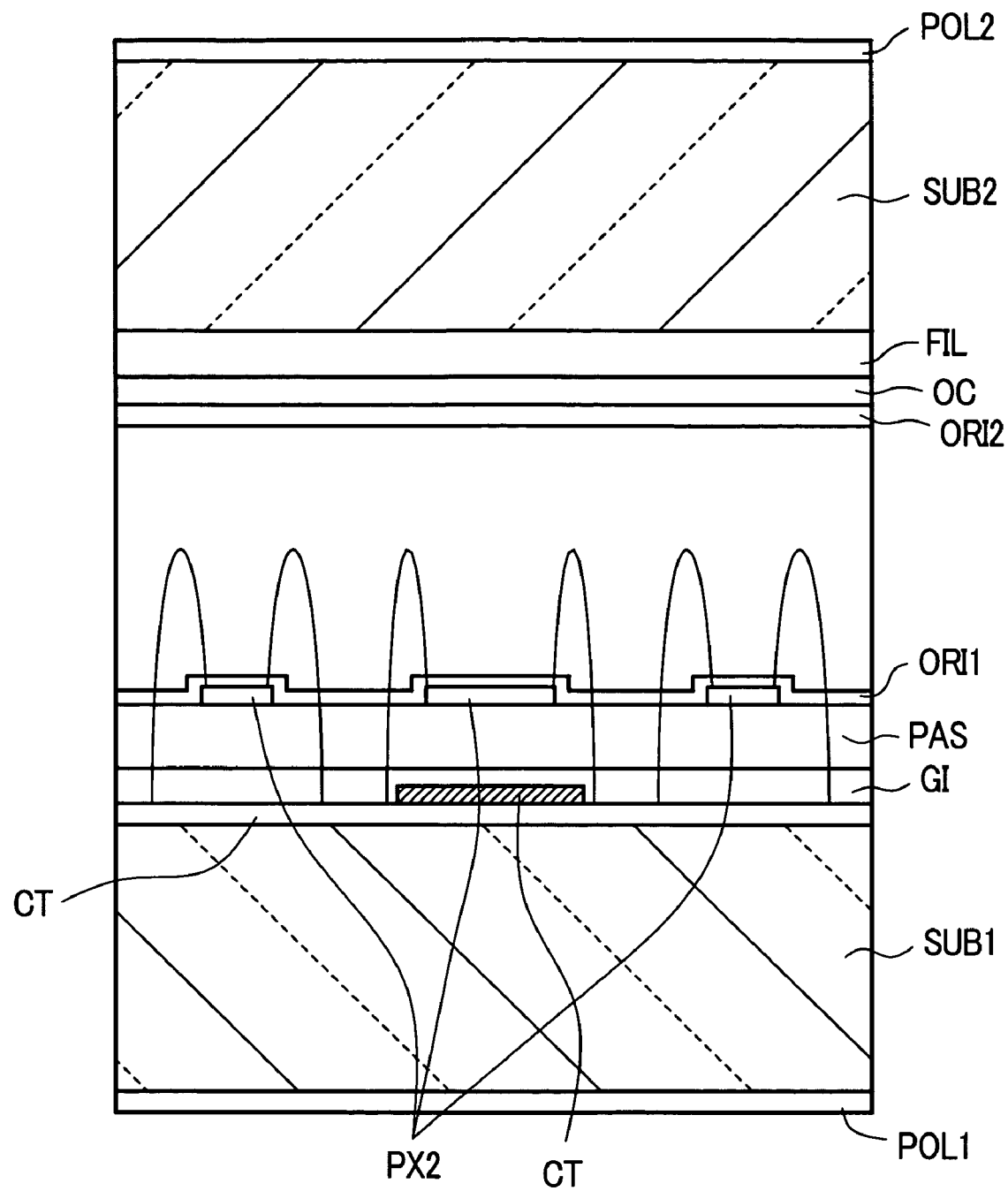
FIG. 8 is a cross-sectional view taken along a line V(a)-V(b) in FIG. 7.
Figure 9:
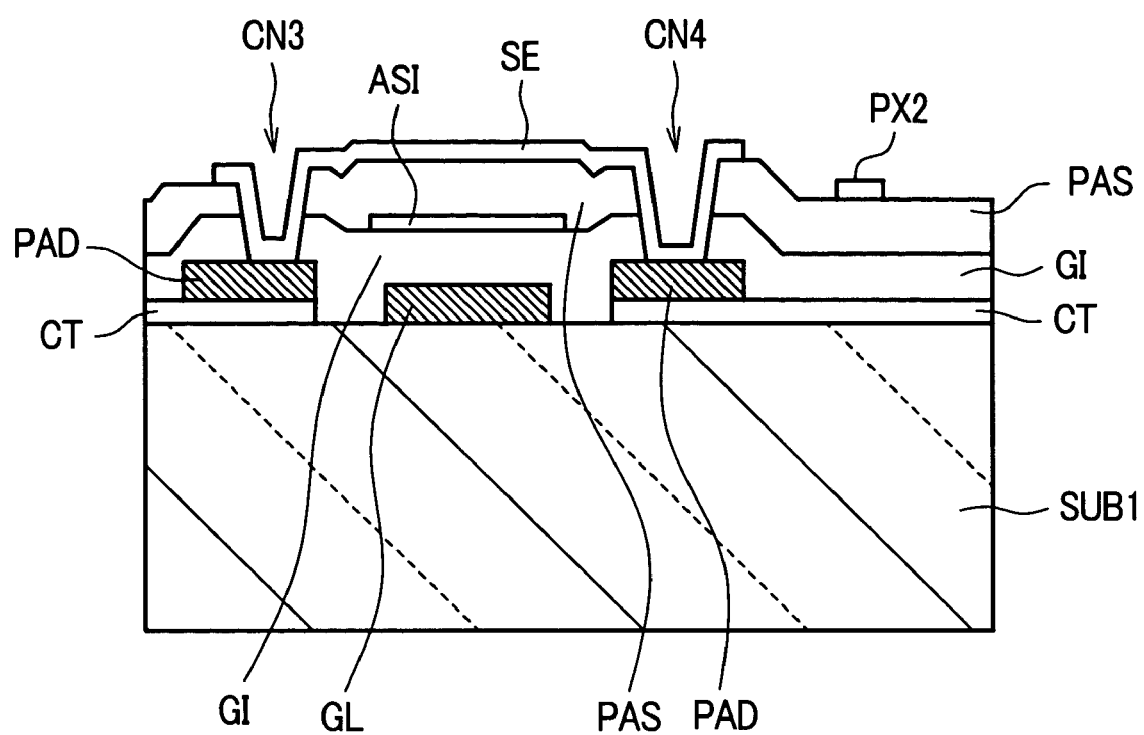
FIG. 9 is a cross-sectional view taken along a line VI(a)-VI(b) in FIG. 7.

FIG. 7 is a plan view showing another embodiment of the liquid crystal display device of the invention, while FIG. 8 and FIG. 9 are cross-sectional views taken along a line V(a)-V(b) and a line VI(a)-VI(b) in FIG. 7.

The constitution in the plan view of FIG. 7 is characterized in that, the redundancy pixel structure which constitutes one object of the invention includes the pixel region in which the data of the drain signal line DL is supplied to the pixel electrode PX1 from the thin film transistor TFT1 through the contact CN1 and the pixel region in which the data of the drain signal line DL is supplied to the pixel electrode PX2 from the thin film transistor TFT2 through the contact CN2 and hence, even when one pixel region becomes defective, another pixel region performs the normal potential operation and, at the same time, provides the redundancy having no color shift in the viewing angle direction.

The large-sized liquid crystal television receiver set has the large pixel size and hence, the point defect failure is liable to become apparent. Further, a demand for wide viewing angle performance is high. This embodiment is equal to the first embodiment with respect to the point that two thin film transistors TFT and two pixel regions are formed in one pixel. In the first embodiment, with respect to the rotational directions of the liquid crystal molecules in two pixel regions in one pixel, in the respective regions formed by the division of pixel, that is, in the left and right regions with respect to the center region of each pixel, the rotational direction of the liquid crystal molecules is set to the clockwise direction and the counterclockwise direction respectively whereby the change of coloring in blue and the change of coloring in yellow as viewed from the viewing angle directions are offset each other. That is, the so-called pixel of two domains is adopted. However, in the embodiment 1, when one pixel region is defective and this defect is a defect of black display, in another normal pixel, the defect is observed as a point colored in yellow or in blue respectively when the liquid crystal display is viewed from the left side and the right side.

In this embodiment, one pixel region which is surrounded by the neighboring gate signal lines GL and the neighboring drain signal lines DL is, first of all, divided into a region which is driven by the first thin film transistor TFT1 and the first pixel electrode PX1 and a region which is driven by the second thin film transistor TFT2 and the second pixel electrode PX2. Further, at a substantially center region of the neighboring gate signal lines GL, a counter voltage signal line CL extends parallel to the gate signal line GL. The counter voltage signal line CL is directly connected with a counter electrode CT, and an electric field is generated between the pixel electrodes PX1 and PX2 so as to display an image.

The pixel electrodes PX1 and PX2 are respectively tilted with respect to the counter voltage signal line CL such that the comb-teeth electrodes assume the symmetrical arrangement with respect to the counter voltage signal line CL. A tilting angle is set to a value within a range of 5 to 30 degrees. This implies that, in the same manner that the optical operation of the liquid crystal is explained in conjunction with FIG. 5, the regions of the respective pixel electrodes PX1 and PX2 further have the region of two domains in which the liquid crystal molecules are rotated in the clockwise direction and in the counterclockwise direction. Accordingly, in the cross-sectional structure shown in FIG. 9, in two transmissive regions (Re1 and Re3) which sandwich the counter voltage signal line CL, the rotational directions of the liquid crystal molecules become different from each other. That is, each pixel region has the two-domain constitution. Due to such a constitution, even when one region formed by the division of the pixel becomes defective and exhibits a black point, the region of another pixel electrode performs the normal operation without being colored as viewed from any direction of the viewing angle whereby it is possible to provide the image quality which is suitable for the application to the liquid crystal television receiver set which requires the wide viewing angle.

FIG. 9 is a cross-sectional view of the connection line SE. The connection line SE is a line which connects the respective counter electrodes CT of the upper and lower neighboring pixel regions. As can be understood from the cross-sectional structure shown in FIG. 9, contact holes CN3, CN4 are formed in the gate insulation film GI and the protective film PSV formed on the counter electrodes CT which are arranged in a rectangular shape in the inside of one pixel such that the counter electrodes CT sandwich the gate signal line GL, and the counter electrodes CT are connected with each other via the contact holes CN3, CN4 by the connection line SE made of ITO which is formed together with the pixel electrode PX in the same step. Below the contact holes CN, pad regions PAD which are formed together with the gate signal line GL in the same step are arranged, wherein these pad regions PAD have an area wider than an area of the second contact hole CN2 and an area of the third contact hole CN3. The pad regions PAD have a function of blocking leaking of light which is generated when the rubbing is insufficient due to stepped portions of the contact holes. In this manner, the gate signal line GL and the counter voltage signal line CL which runs parallel to the gate signal line GL are electrically connected with each other due to the repeated constitution of the counter electrode CT, the pad regions PAD and the connection lines SE.

EMBODIMENT 3

Figure 10:
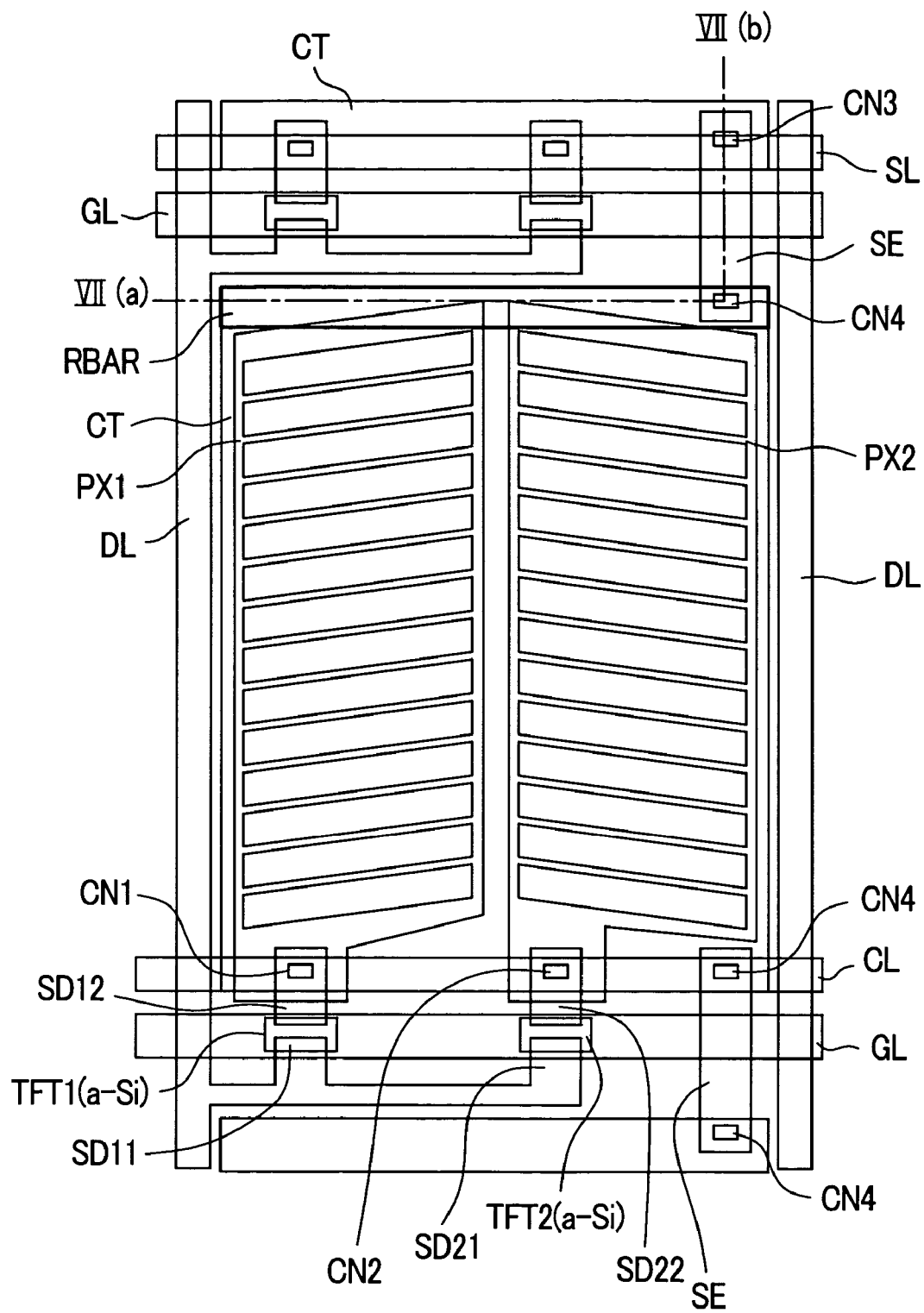
FIG. 10 is a plan view showing another embodiment of a pixel region of a liquid crystal display device according to the invention.
Figure 11:
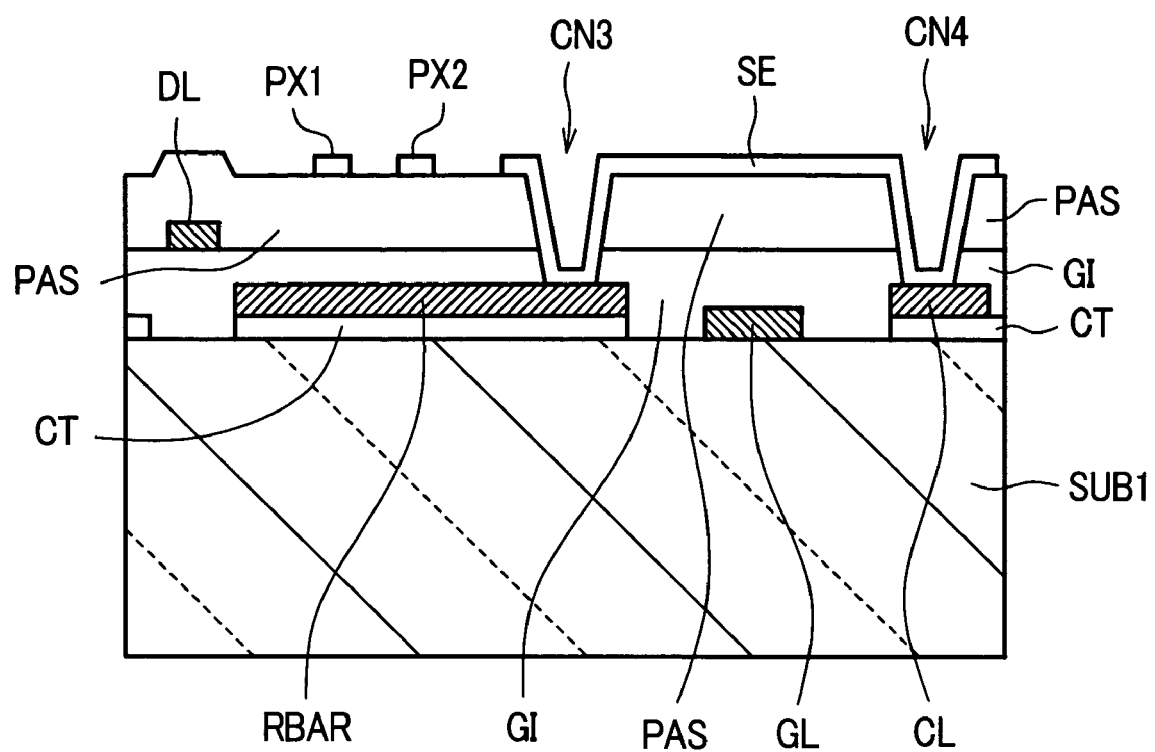
FIG. 11 is a cross-sectional view taken along a line VII(a)-VII(b) in FIG. 10.
Figure 12:
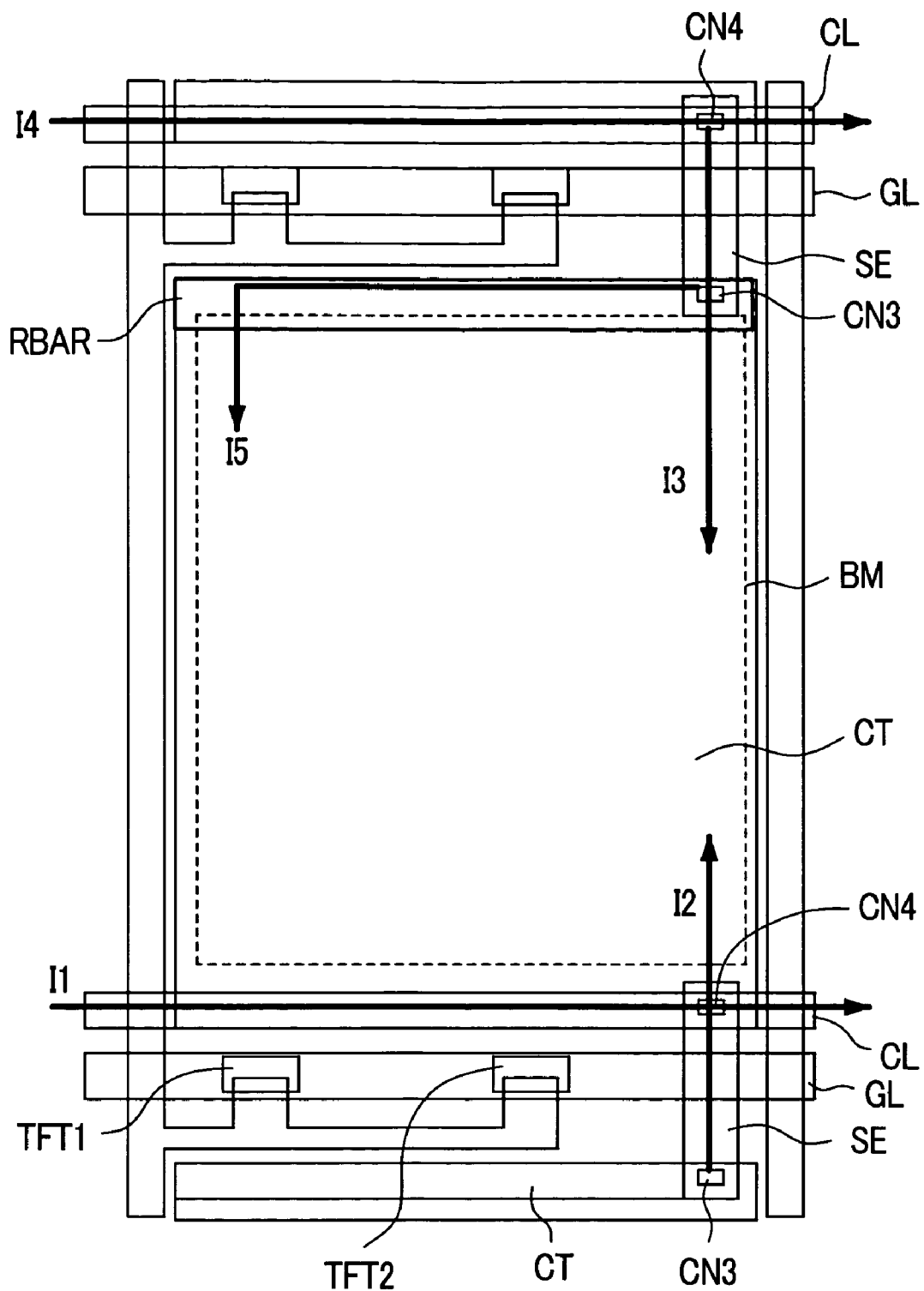
FIG. 12 is a schematic plan view of a pixel which shows a resistance reduction effect in the embodiment.

FIG. 10 is a plan view showing another embodiment of the liquid crystal display device according to the invention and FIG. 11 is a cross-sectional view taken along a line VII(a)-VII(b) in FIG. 10. FIG. 12 is a view showing an electrical connection state of the counter electrode CT and the counter voltage signal line CL which is connected to the counter electrode CT and schematically explains this state using a portion of each thin film layer in a layout of the plan view of the pixel shown in FIG. 10.

One pixel according to this embodiment shown in the plan view basically performs the substantially equal operation as the liquid crystal display device of the embodiment 1. The structure which produces a novel advantageous effect lies in that with respect to the counter electrode CT which is arranged in a rectangular shape in one pixel region sandwiched by the neighboring gate signal lines GL and the neighboring drain signal lines DL and is constituted of the transparent electrode, a resistance lowering electrode RBAR is formed on another end portion of the counter voltage signal line CL which allows one end portion thereof neighboring to the gate line GL to traverse the drain signal line DL in an intersecting manner. The resistance lowering electrode RBAR is characterized by having the following structure and gives rise to particular manner of operation and advantageous effects. The resistance lowering electrode RBAR extends in the direction parallel to the gate signal line GL and the counter voltage signal line CL. However, the resistance lowering electrode RBAR largely differs from the gate signal line GL and the counter voltage signal line CL with respect to a point that the resistance lowering electrode RBAR does not intersect the drain signal line DL and is held within one pixel. The gate signal line GL or the counter voltage signal line CL is separated from the gate insulation film GI in terms of the cross-sectional structure. However, when the insulation film of such a portion becomes defective due to dust or the like during the manufacturing step, a line defect arises. If the resistance lowering electrode RBAR does not intersect the drain signal line DL, such a defect is not generated. Even when the resistance lowering electrode RBAR does not intersect the drain signal line DL, the resistance lowering electrode RBAR can lower the resistance of a wiring network formed by the counter electrode CT and the counter voltage signal line CL.

FIG. 11 shows the cross-sectional structure of a portion where the resistance lowering electrode RBAR and the counter electrode CT to which the resistance lowering electrode RBAR is connected are connected with the connection line SE which is formed such that the connection line SE strides over the gate signal line GL. The resistance lowering electrode RBAR is made of metal wiring material and is formed in the same step as the gate signal line GL or the counter voltage signal line CL on the counter electrode CT which is made of ITO. The resistance lowering electrode RBAR is connected with the connection line SE which is formed of ITO made of a transparent electrode material formed in the same step as the pixel electrode PX with respect to the contact holes CN3 and CN4 which are formed in the gate insulation film GI and the protective insulation film PAS such that the resistance lowering electrode RBAR strides over the gate signal line GL.

FIG. 12 is a plan view of the pixel showing an advantageous effect obtained by the resistance lowering electrode RBAR, wherein only layers which are necessary for explanation are described among thin film layers which constitute the device. The counter voltage signal line CL is formed of a metal line having low resistance and includes a low resistance component (flow of an electric current) in a path indicated by symbol I1. The counter voltage signal line CL is connected with the rectangular counter electrode CT having high resistance which is formed of ITO. A current path I4 of the counter voltage signal line CL of a preceding stage which strides over the gate line GL lowers the voltage distortion of the counter electrode CT of the pixel to which the connection line I3 per se belongs using the connection line I3. Due to the advantageous effect obtained by the resistance lowering electrode RBAR, the spreading resistance of a current path I5 is generated. Compared to a case in which the resistance lowering electrode RBAR is not provided and hence, a current path is only formed in the vicinity of the contact hole CN3, the electric current spreads over the whole surface of the counter electrode CT and hence, the voltage distortion is attenuated.

Due to the above-mentioned resistance lowering effect, as a result, compared to a case in which the connection line SE and the resistance lowering electrode RBAR are not provided, a line width of the counter voltage signal line CL per se can be narrowed and hence, the region which is not covered with the black matrix BM can be increased whereby the numerical aperture can be increased.

Next, other roles of the resistance lowering electrode RBAR which strides over the gate signal line GL and the counter voltage signal line CL for enhancing the transmissivity are explained. The gate signal line GL and the counter electrode CT are formed on the same layer. It is needless to say that when the gate signal line GL and the counter electrode CT are short-circuited, a line defect failure arises. Accordingly, it is necessary to form the gate signal line GL and the counter electrode CT on a plain with a fixed distance therebetween. The resistance lowering electrode RBAR and the counter voltage signal line CL can effectively block an undesired light, that is, light of a lower backlight from passing through the gap in the oblique direction. This is because that compared to the prior art in which the gate line GL is formed to stride over the counter voltage signal line CL, the resistance lowering electrode RBAR does not intersect the drain signal line DL and hence, the lowering of a yield rate attributed to short circuiting defect which is generated when the resistance lowering electrode RBAR does not intersect the drain signal line DL is eliminated.

What is claimed is:

1. A liquid crystal display device comprising:
    a first substrate and a second substrate which are arranged to face each other with a liquid crystal layer therebetween;
    a plurality of gate signal lines and a plurality of drain signal lines which intersect the gate signal line; the gate signal lines and the drain signal lines being formed on the first substrate;
    pixel regions which are formed of regions each of which is surrounded by the neighboring gate lines and the neighboring drain lines; and
    a planar counter electrode is formed on the first substrate in each pixel region, wherein
    a pixel electrode is formed on the counter electrode by way of an insulation layer,
    the pixel electrode is formed of a first pixel electrode and a second pixel electrode in the pixel region,
    the first pixel electrode and the second pixel electrode have a large number of slits which are arranged in parallel in the electrodes and the extending direction of the slits is different from both extending directions of the gate lines and the drain lines, and
    the neighboring sides of the first and the second pixel electrodes are arranged parallel to each other, and a portion between the neighboring sides of the first and the second pixel electrodes is positioned above the counter electrode.

2. A liquid crystal display device according to claim 1, wherein the neighboring sides of the first and the second pixel electrodes are arranged in parallel to the drain line.

3. A liquid crystal display device according to claim 2, wherein the extending direction of the slits formed in the first pixel electrode and the extending direction of the slits formed in the second pixel electrode are different from each other.

4. A liquid crystal display device according to claim 3, wherein the slits formed in the first pixel electrode and the slits formed in the second pixel electrode extend in the directions which become symmetrical with respect to the extending direction of the drain lines.

5. A liquid crystal display device according to claim 4, wherein the first pixel electrode is connected with a first thin film transistor element and the second pixel electrode is connected with a second thin film transistor element.

6. A liquid crystal display device according to claim 5, wherein the first thin film transistor element and the second thin film transistor element are controlled using the same gate line and are connected with the same drain line.

7. A liquid crystal display device according to claim 6, wherein the orientation direction of liquid crystal molecules of the liquid crystal layer is the direction which is orthogonal to the drain lines.

8. A liquid crystal display device according to claim 7, wherein the extending directions of the slits of the first pixel electrode and the second pixel electrode make an angle which falls within a range of 30 degrees in the clockwise direction or in the counterclockwise direction with respect to the extending direction of the gate signal line.

9. A liquid crystal display device according to claim 2, wherein the orientation direction of liquid crystal molecules of the liquid crystal layer is the direction which is orthogonal to the drain lines.

10. A liquid crystal display device according to claim 9, wherein the extending directions of the slits of the first pixel electrode and the second pixel electrode make an angle which falls within a range of 30 degrees in the clockwise direction or in the counterclockwise direction with respect to the extending direction of the gate signal line.

11. A liquid crystal display device according to claim 1, wherein the first pixel electrode is connected with the first thin film transistor element, and the second pixel electrode is connected with the second thin film transistor element.

12. A liquid crystal display device according to claim 11, wherein the first thin film transistor element and the second thin film transistor element are controlled using the same gate line and, at the same time, are connected with the same drain line.

* * * * *